May 29, 1962     C. D. MILLER     3,036,837
AGRICULTURAL IMPLEMENT
Filed July 15, 1959     4 Sheets-Sheet 1
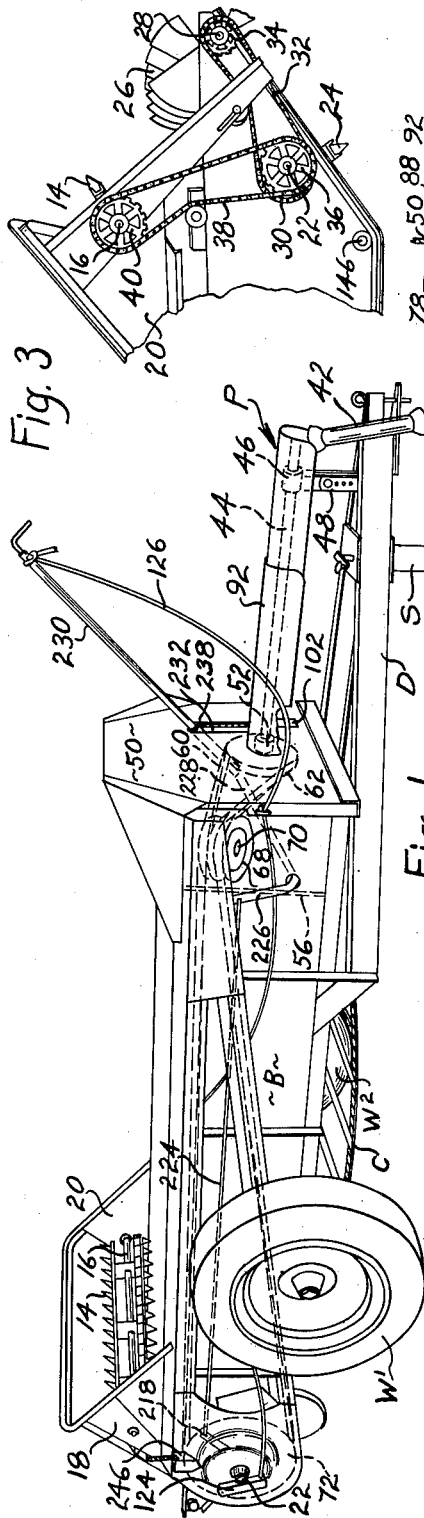
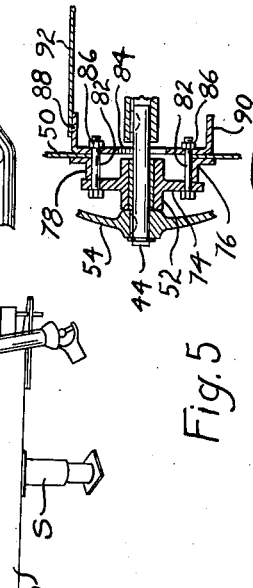
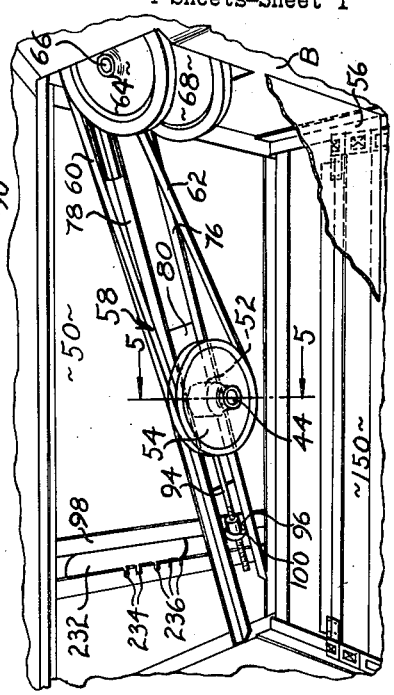
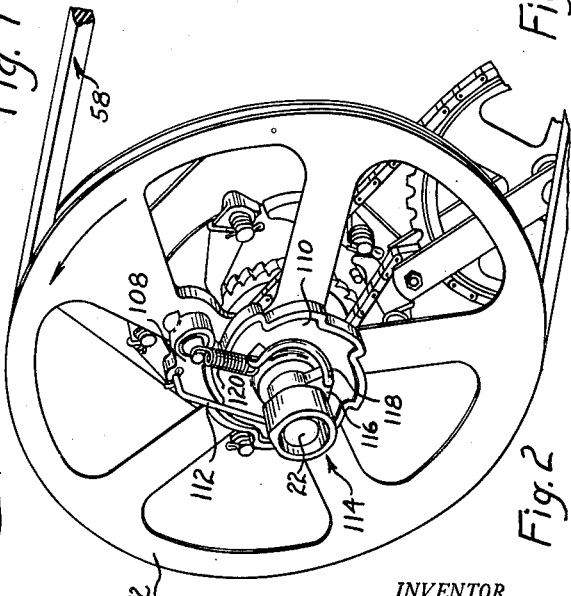
INVENTOR.
Charles D. Miller
BY
Emerson B Donnell
ATTORNEY May 29, 1962
C. D. MILLER
3,036,837
AGRICULTURAL IMPLEMENT
Filed July 15, 1959
4 Sheets-Sheet 2
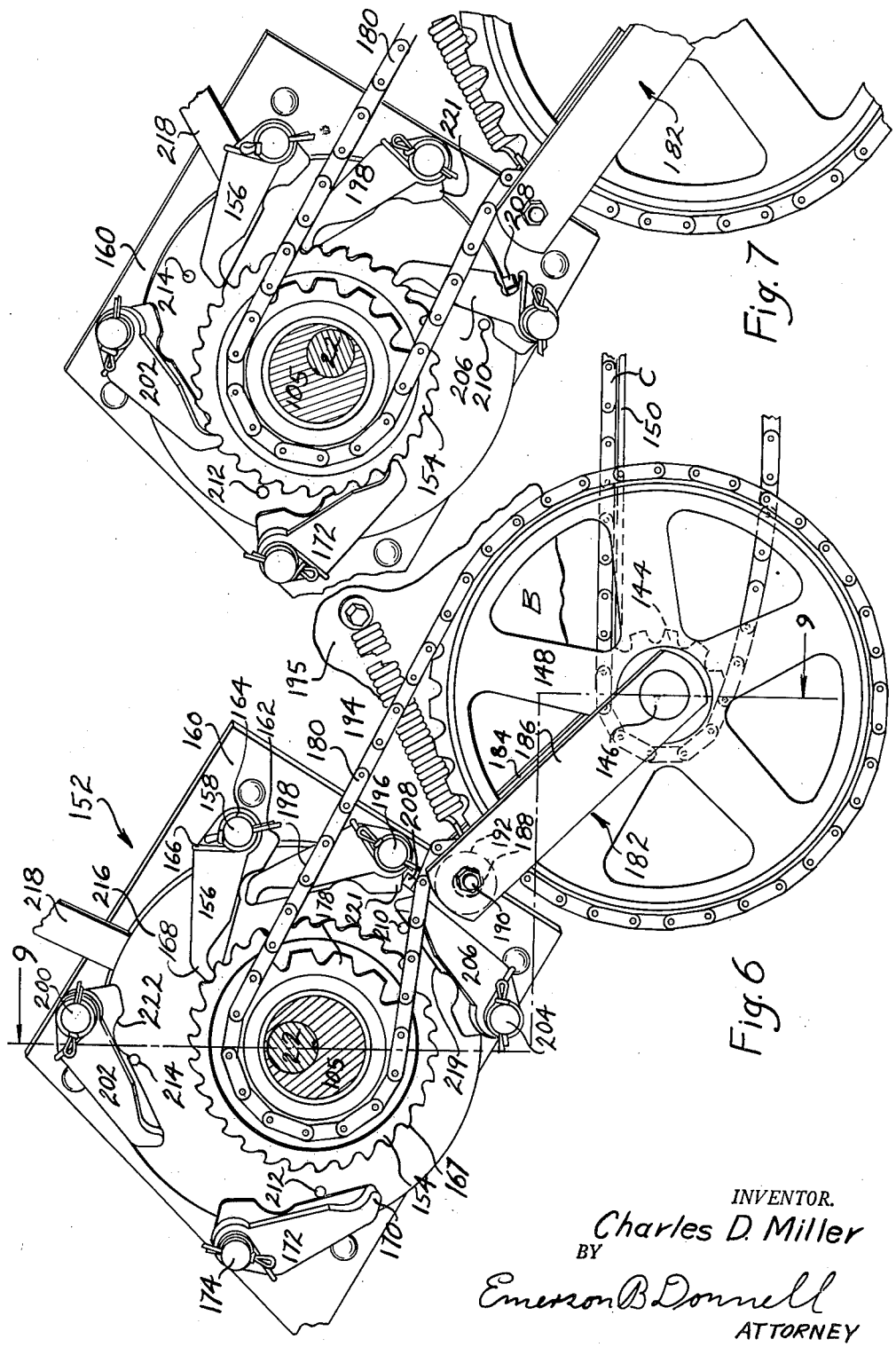
INVENTOR.
Charles D. Miller
BY
Emerson B. Donnell
ATTORNEY May 29, 1962  C. D. MILLER  3,036,837
AGRICULTURAL IMPLEMENT
Filed July 15, 1959  4 Sheets-Sheet 3
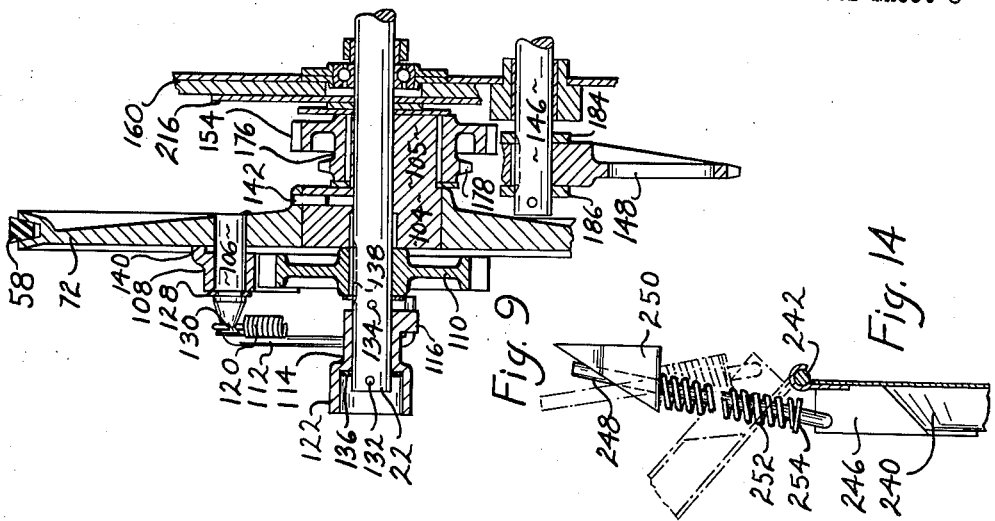
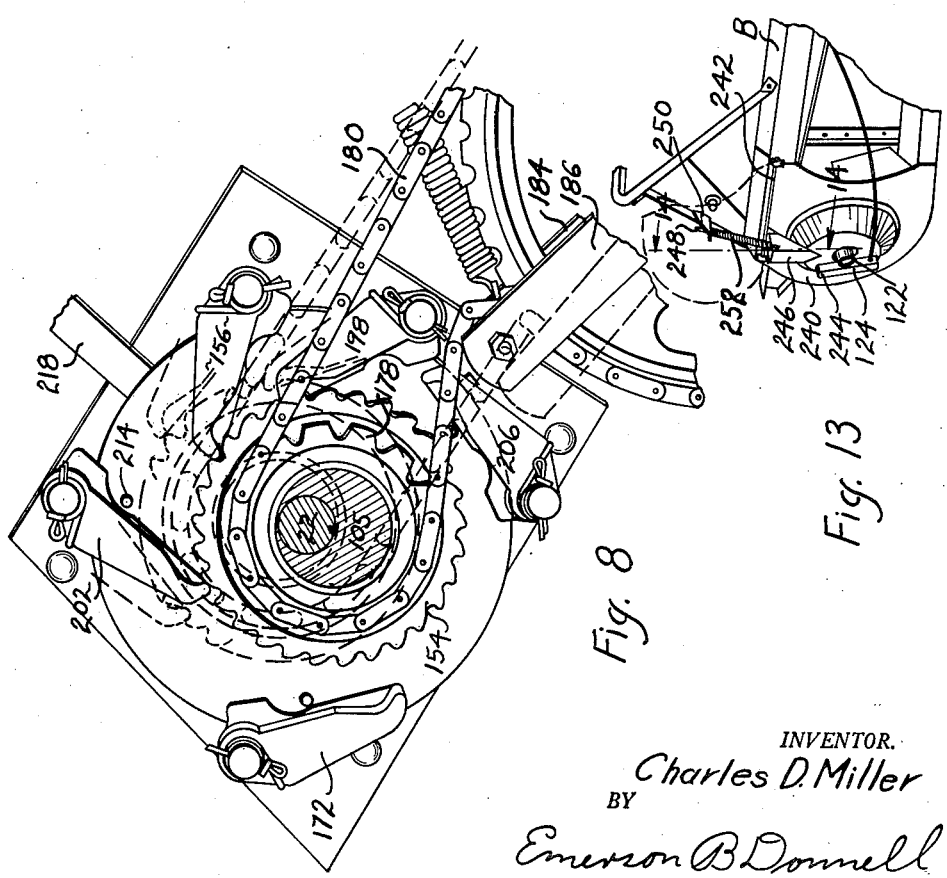
INVENTOR.
Charles D. Miller
BY
Emerson B. Donnell
ATTORNEY May 29, 1962  C. D. MILLER  3,036,837
AGRICULTURAL IMPLEMENT
Filed July 15, 1959  4 Sheets-Sheet 4

INVENTOR.
Charles D. Miller
BY
Emerson B. Donnell
ATTORNEY

United States Patent Office 3,036,837
Patented May 29, 1962

3,036,837
AGRICULTURAL IMPLEMENT
Charles D. Miller, Rockford, Ill., assignor to J. I. Case Company, Racine, Wis., a corporation of Wisconsin
Filed July 15, 1959, Ser. No. 827,247
10 Claims. (Cl. 275—6)

The present invention relates to manure spreaders and an object thereof is to generally improve the construction and operation of devices of this class.

Spreaders of this general type were originally drawn by horses and the conveying and spreading mechanism was driven from the supporting wheels, of necessity at moderate or low speeds. Upon the advent of the tractor, however, these spreaders were soon found to be drawn by tractors, the speeds of operation being markedly increased so that the relatively crude mechanism for gradually unloading and spreading the material was subjected to stresses, impacts, and the like, completely beyond anything contemplated when the machinery was originally laid out for horse drawn operation. The tractor also brought with it the power take-off and introduced the possibility of operating the spreading machinery from this more dependable source of power, making possible still greater speed and capacity in the mechanism. However, the aforesaid problems were only further exaggerated by this event and, therefore, it is a further object of this invention to provide improved mechanism which is particularly adapted for operation from a tractor power take-off, and further objects are:

To provide a novel and effective drive for actuating the apron at various selected speeds;

To provide such a drive which will approach continuous actuation or movement of the feed apron;

To provide a novel method and means for transmitting the power from the power take-off shaft to the working elements of the unloading and spreading mechanism;

To provide a novel power control for starting and stopping the mechanism at will;

To provide a novel and effective frangible driving connection in the power train which will release dependably in the event of an overload, and which is provided with a cheap and readily replaced breakable element; and To provide numerous expedients for the realization of the above objects.

The construction and arrangement by which these objects are accomplished are fully set out in the following description and accompanying drawings in which:

FIGURE 1 is a right side perpsective view taken from a little in front of a spreader involving the invention.

FIG. 2 is a similar view, enlarged, with parts removed to show certain mechanism indicated in FIG. 1.

FIG. 3 is a left side elevation of a fragment of the machine with parts removed to show a drive assembly.

FIG. 4 is a perspective view with parts removed looking forwardly and downwardly into the box portion of the spreader.

FIG. 5 is a sectional view substantially on the line 5—5 of FIG. 4.

FIG. 6 is a side elevation of the mechanism shown in FIG. 2, further enlarged, and with parts removed.

FIG. 7 is a similar view with parts broken away showing the components in a different position.

FIG. 8 is a view similar to FIG. 6 showing the parts in a still different position.

FIG. 9 is a sectional view taken substantially on the line 9—9 of FIG. 6.

FIG. 13 is a perspective view, somewhat enlarged, of certain construction indicated in FIG. 1.

FIG. 14 is a sectional detail, further enlarged, taken substantially on the line 14—14 of FIG. 13.

Similar reference characters have been applied to the same parts throughout the drawings and the following specification, which is to be taken as exemplary and not restrictive.

Figure 11:
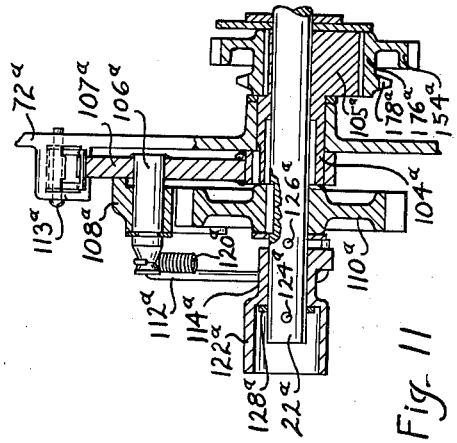
FIG. 11 is a view similar to FIG. 9, but with parts removed and showing the structure of FIG. 10.

Returning to FIG. 1, the device embodying the invention is in the form of a two wheeled power take-off manure spreader having a wagon box or body portion B supported on wheels $W^1$ and $W^2$ and having a drawbar construction D arranged to be connected to and supported on a tractor of any suitable type, not shown. When not attached to a tractor, drawbar portion D is supported upon a stand or jack S, and a power take-off or extension shaft P of substantially conventional construction is connected to the tractor power take-off shaft in well-known manner for the actuation of the spreader machinery. A conveyor chain or apron C is arranged in the bottom of box B in conventional manner and is actuated by the spreader mechanism, as will be described presently.

The spreader has a conventional beater 14, including a shaft 16, which is journaled in suitable bearings in upward extensions 18 and 20 of box B, and a second beater shaft 22 is also journaled in the sides of box B and carries a beater structure 24, FIG. 3, which operates in well-known manner to disintegrate the material and feed it to a widespread 26 carried on a shaft 28. Shaft 22 is rotated as will be described and drives, through a sprocket 30 and a chain 32, a sprocket 34 fixed on shaft 28. Shaft 22 also drives, through a sprocket 36 and chain 38, a sprocket 40 fixed on above mentioned shaft 16. In this way widespread 26 and beater 14 are both driven from rotation of shaft 22.

Returning to FIG. 1, shaft 22 is driven from above mentioned power take-off P, as follows: A knuckle shaft of well-known form and generally designated as 42 is connected to the tractor power take-off in well-known manner and rotates a shaft 44 carried in a bearing 46 supported from drawbar D on a standard 48. Shaft 44 extends through the front wall 50 of box portion B and is carried in a bearing portion 52 supported from wall 50, as will appear. Shaft 44 carries, fixed thereon, a pulley 54 disposed within box portion B between wall 50 and a wall 56, which closes off a space between itself and wall 50 to prevent encroachment of the contents of box B on the space about pulley 54. Pulley 54 has a belt 58 which in the present instance is of the so-called V section and which extends laterally from pulley 54, in the form of two runs 60 and 62, run 60 passing about an idler pulley or mule 64 journaled in an inclined position on a pintle or stub shaft 66 fixed in any suitable manner to box portion B, while run 62 is engaged with an idler pulley or mule 68 journaled on a similarly supported pintle or stub shaft 70, as seen in FIG. 1. Runs 60 and 62 then extend backwardly along the side of box portion B and about a relatively large pulley 72, which is supported on and fixed in relation to above mentioned shaft 22 when the mechanism is in operation. It will thus be apparent that rotation of power take-off shaft 44 in the usual manner will cause rotation of shaft 22 and, through the mechanism described and shown in FIG. 3, rotation of beaters 24 and 14 together with widespread 26. Conveyor apron C is also actuated from shaft 22, as will appear, but it will now be apparent that all of the fast moving components of the spreader are actuated from shaft 44 in an extremely simple and direct manner, which will avoid much of the wear and tear common to past construction, and which will be quiet and efficient in operation.

Returning to FIG. 4, bearing portion 52 has a flange portion 74, FIG. 5, slidably arranged on guides 76 and 78 on wall 50 and in the present instance consisting of angle irons with flanges extended inwardly along the margins of an opening 80. Flange portion 74 is engaged with the inner edges of flanges 76 and 78 and has a plurality of bolts 82 extending substantially parallel to shaft 44 and slidably engaged with guides 76 and 78. Bolts 82 extend through a clamping plate 84 engaged with the outer surface of wall 50 beyond the margins of opening 80, the parts being rigidly secured together by the action of nuts 86 threaded on bolts 82. In this manner bearing 52 is very strongly and rigidly supported on wall 50, while, by the expedient of loosening nuts 86, the assembly may be shifted in the direction of guides 76 and 78 for adjusting the tension in belt 58, while kept generally in position by engagement of bolts 82 with guides 76 and 78.

Plate 84 has flanges 88 and 90 extending forwardly therefrom for attachment of a power take-off guard or housing 92, which forms no part of the present invention and need not be further described. For effecting the above mentioned shifting of plate 84, and accordingly of bearing 52, a rod 94 is fixed in any suitable manner, in the present instance with plate 88, and extended through a guide or bracket means 96 fixed to a frame element 98 forming part of wall 50. Rod 94 is threaded and has a nut 100 readily accessible through an opening 102, FIG. 1, in wall 50. As will be apparent, when adjustment of belt 58 is required, it is a simple matter to loosen nuts 86 and to shift bearing 52 by manipulation of nut 100, the bearing assembly sliding freely within opening 80 guided by bolts 82. When the desired adjustment is reached, nuts 86 will be tightened, whereupon the bearing will be very solidly mounted independently of adjusting rod 94.

Large pulley 72 is grooved, as shown in FIG. 2, to receive belt 58 and is fixed in relation to a hub 104 having an eccentric portion 105, FIG. 9, the hub being journaled on above mentioned shaft 22 so as to be capable of rotating freely in relation thereto, and pulley 72 drives shaft 22 through a novel ratchet type clutch device. A pin 106 is fixed in relation to pulley 72 and extends substantially parallel to shaft 22, spaced radially therefrom. Journaled on pin 106 is a driving pawl 108 extending from the pin generally in the direction of rotation of pulley 72 and engaged with one of the teeth of a ratchet wheel 110, ratchet wheel 110 being fixed in relation to shaft 22 so that when pawl 108 is engaged as shown, shaft 22 is driven in fixed relation to pulley 72. Pawl 108 may be engaged and disengaged with ratchet 110 at will by means of an over-center mechanism, including a link 112 pivoted to pawl 108 at a point displaced from pin 106 circumferentially of pulley 72. Link 112 is also pivoted to a sleeve, hub, or collar generally designated as 114 at a point radially displaced from the center of shaft 22 such that rotation of sleeve 114 relatively to pulley 72 in one direction will shift pawl 108 away from ratchet 110, while such rotation in the opposite direction will shift pawl 108 into engagement with ratchet 110. This structure is identical with the modification shown in FIG. 11 and to which reference may also be made.

Sleeve 114 has a lug 116 in which is pivoted an over-center link 118 which is shaped so as to extend about sleeve 114 to a region generally diametrically opposite lug 116, but without otherwise contacting sleeve 114. In said region a spring 120 is connected with link 118 and extended in tension to any suitable fixed point or anchorage on pulley 72, for convenience above mentioned pin 106. Thus the pull of spring 120 will tend to cause rotation of sleeve 114 relatively to shaft 22 in one or the other direction in accordance with the relative position of lug 116. With the parts in the position shown in FIG. 2 (see also FIG. 11), link 118 is urged upwardly and tends to rotate sleeve 114 in a counterclockwise direction, thereby exerting a downward pull on link 112 and to resiliently maintain pawl 108 in contact with ratchet 110. If sleeve 114 is rotated by an outside force in a clockwise direction, link 118 will be urged downwardly and transferred to the other side of a plane extending through pin 106 and shaft 22. The upward pull of spring 120 on link 118 will then tend to cause clockwise rotation of sleeve 114 and to maintain pawl 108 in a position out of engagement with ratchet 110. (See dotted position in FIG. 11.)

It will be understood that, in operation, the parts all rotate together, maintaining the relations to each other shown in FIG. 2, but that certain manipulation of them is possible while they are in operation.

Hub 114 has a grip or brake portion 122 axially displaced from lug 116 outwardly of ratchet 110 and in position to be engaged by a brake shoe or bar 124, FIG. 1, which may be shifted into contact with brake portion 122 by a pull on a control rope 126. Thus when it is desired to stop the action of beaters 14 and 24, together with widespread 26, this may be done by a pull on control rope 126, the effect being to retard sleeve 114, which, as stated, is rotating with pulley 72, and which is equivalent to rotating it clockwise in relation to shaft 22, thus bringing the parts into the dotted position of FIG. 11 and permitting pulley 72 to run freely without driving shaft 22.

Since the parts rotate quite rapidly in normal operation and possess considerable mass, it is not desirable that pawl 108 be shifted from disengaged position while pulley 72 is rotating, and such action is virtually impossible with the arrangement disclosed. Pulley 72 runs counterclockwise as seen in FIG. 2 at approximately 250 revolutions per minute and unless sleeve 114 is rotated in the same direction in excess of this rate, pawl 108 cannot be engaged with ratchet 110. This constitutes an important safety feature, since the mechanism cannot be damaged by engagement of the positive driving parts while pulley 72 is rotating. When it is desired to again start the beaters, the power shaft 44 is stopped by the means normally provided on the tractor, after which it is a simple matter to rotate grip portion 122 manually in a counterclockwise direction, which will shift pawl 108 back into engagement with one of the teeth of ratchet wheel 110, the over-center effect of spring 120 and link 118 maintaining the parts in this relation. Shaft 44 may then be restarted so as to again establish rotation of pulley 72, shaft 22 and the beaters and widespread, as will be apparent.

Other advantages accrue as a result of the construction disclosed. As stated, the beaters and widespread comprise considerable mass and when running have a large amount of momentum. If the spreader is empty these parts will tend to continue to run and exert a substantial driving force on the tractor for a significant length of time through shaft 144. However, with the disclosed construction, if it is attempted to suddenly stop the tractor, shaft 44 and its connected parts, including pulley 72, may stop abruptly while widespread 26 and beaters 14 and 24 may continue to run or coast until the stored energy is dissipated, ratchet wheel 110 merely rotating while pawl 108 rides over the teeth thereof under the resilient urging of spring 120. While the mechanism is operating with a load in box portion B, it would be highly undesirable to disengage pawl 108, since conveyor C would then crowd the load against the stationary beaters with likelihood of serious damage to the parts. However, under these conditions there is appreciable pressure between pawl 108 and ratchet wheel 110, such that the resulting substantial friction prevents ready disengagement of the pawl from the wheel. As a result, it is ordinarily not possible to disengage the drive when running, except at such times as the box is substantially empty, as is desirable for allowing the conveyor C to clear out the last remnants of the load, and at which time there is virtually no material remaining and no reason to continue the operation of the beaters. Thus is provided a construction in which the parts are normally positively driven, but in which the drive can be readily interrupted while the mechanism is running, and in which the heavy rotating parts may continue to run upon sudden interruption of the driving force. Furthermore, the drive cannot be re-engaged until the driving mechanism has first been brought to rest, and neither can it be disengaged while operating under load.

Above mentioned pin 106 is provided in the present instance with a snap ring 128 which retains pawl 108 in place and the pin is reduced in size at 130 to provide a suitable secure anchorage for spring 120. Sleeve 114 is retained axially on shaft 22 by means of pins 132 and 134, a thrust washer 136 being interposed between the sleeve and pin 132 within brake portion 122. Ratchet wheel 110 is secured on shaft 22 by means of a key 138. A flange 140 on pawl 108 engages a portion of pulley 72 to maintain the proper location of the pawl in relation to ratchet wheel 110.

Pulley 72 also actuates the feeding apron or conveyor C as will now be described. As heretofore mentioned, pulley 72 is fixed on hub 104 having an eccentric portion 105 and causes rotation thereof by reason of a pin 142, FIG. 9. Hub portion 104 transmits the motion, as will appear, to above mentioned conveyor chain C, which is engaged with sprockets 144, FIG. 6, fixed on a shaft 146 suitably journaled in the sides of box portion B and carrying, outside of box B a sprocket 148, so that rotation of sprocket 148 will cause movement of conveyor C along the bottom 150 of box portion B in substantially conventional manner. This feeds the material within box B rearwardly into the beaters in well-known manner.

Such rotation of sprocket 148 is caused by a variable speed mechanism generally designated as 152, and which is constituted as follows: Hub 104 is journaled on shaft 22 so as to be freely rotatable thereon and has a driven toothed wheel 154 rotatably mounted on the eccentric portion 105 thereof so as to be carried around bodily by rotation of hub portion 104, but wheel 154 is prevented from rotating about its own axis (except to a limited degree) by engagement of a pawl 156 journaled on a pin 158 fixed on a plate 160 securely fastened to the side of box portion B. Pawl 156 is retained in place on pin 158 by a cotter, or the like, 162 and a spring 164 engaged with cotter 162 and having an offset portion 166 engaged with pawl 156, resiliently urges pawl 156 into engagement with the teeth 167 on wheel 154. With the mechanism so far described wheel 154 will revolve or move bodily in a circular path about the center of shaft 22, but because of the engagement of pawl 156, wheel 154 will not rotate appreciably about its own axis, but will merely rock first in one direction and then in the other as determined by the relation between the center of eccentric portion 105 and the point of engagement of the finger portion 168 of pawl 156 with wheel 154. However, it will be noted that wheel 154, while prevented from rotating under finger portion 168, has on its side opposite finger portion 168 a quite substantial to and fro component of motion, for example, in the region of a finger portion 170 on a pawl 172 pivoted on a pin 174 also carried on plate 160, and it will be appreciated that if it is assumed for purposes of explanation that finger portion 170 were resiliently engaged with the teeth on wheel 154, that this portion of the wheel would be permitted to move in one direction involving the aforesaid to and fro motion, but would not be permitted to move in the other direction because of engagement of finger 170 with the teeth 167. During such movement wheel 154 would swing about finger 170 and the center of eccentric portion 105 and cause movement of the portion of wheel 154 engaged with finger 168 in the direction permitted by pawl 156. This would result in limited rotation of wheel 154 in a counterclockwise direction. As will be apparent, an instant later the situation will be reversed and wheel 154 will swing about finger 168 causing advancement of the teeth in contact with finger 170, resulting in a further counterclockwise rotation of wheel 154. Thus when one pawl alone is in engagement with wheel 154, no substantial rotation of wheel 154 takes place, but if two pawls are in engagement with the wheel, a slow rotation takes place, in addition to the revolving or bodily translation of the wheel about the center of shaft 22.

Toothed wheel 154, as better seen in FIG. 9, is fixed on a sleeve portion 176, which also has a sprocket portion 178 carrying a chain 180, FIG. 6, engaging with above mentioned sprocket 148. The aforementioned slow rotation of wheel 154 is thereby transmitted to sprocket 148 and causes rotation thereof and actuation of conveyor C, as heretofore suggested. It will be apparent that substantial slack must be provided in chain 180 to provide for the periodic displacement or revolving of sprocket 178, and to prevent the chain from running off the sprockets, a tightener generally designated as 182 is provided, comprising spaced arms 184 and 186 journaled on shaft 146 and extending generally in the direction of shaft 22. Arms 184 and 186 provide space for sprocket 148 between them and are separated at their ends remote from shaft 146 by a spacer 188 while being secured in clamping relation therewith by a bolt 190. A roller 192 is journaled on spacer 188 between arms 184 and 186 on which chain 180 may run, the arms being urged in a clockwise direction about shaft 146 by a spring 194 anchored to a suitable stable connection 195 on box B. Tightener 192 oscillates freely about shaft 146 and maintains desirable tension in chain 180 in spite of the rather substantial gyrations of sprocket 178.

As understood in this art, a variety of feeding speeds is desirable, and for this purpose other pawls are provided on above mentioned plate 160. For example, a pin 196 is fixed upon above mentioned plate 160 and has journaled thereon a pawl 198 similar in all respects to pawl 156. Similarly, a pin 200 is fixed to plate 160 and has a pawl 202 also similar to pawl 156, while a pin 204 fixed to plate 160 carries a pawl 206. Pawl 198, being relatively close to pawl 156, will, when engaged with teeth 167, receive a relatively minor amount of movement of teeth 167 and will, therefore, advance wheel 154 a minimum amount when engaged. However, pawl 202, being spaced a greater amount from pawl 156, will cause a greater amount of rotation of wheel 154, which situation is shown in FIG. 8. Pawl 206 and pawl 172 when engaged with wheel 154 will cause respectively increasing amounts of rotation of wheel 154. As a practical matter, engagement of pawl 156 alone will merely cause a to and fro rocking of wheel 154 (exclusive of the gyratory movement thereof), while pawl 198 when engaged along with pawl 156 will cause a rotation of wheel 154 equivalent to the space of one tooth for each complete rotation of eccentric portion 105. Engagement of pawl 202 as illustrated in FIG. 8 will cause wheel 154 to advance two teeth for every turn of eccentric portion 105, pawl 206 will cause advancement of three teeth per turn, and engagement of pawl 172 as seen in FIG. 7 will cause an advance of four teeth per turn. Thus, by controlling the number of pawls in engagement with wheel 154, the speed of rotation of wheel 154 can be controlled. However, it is to be noted that all of the pawls in use, 2, 3, 4 or 5, as the case may be, are allowed to be engaged with wheel 154 at the same time, which results in a smoother movement of the feeding mechanism than would otherwise be the case. If pawl 172 were engaged alone with pawl 156 (which of course is not possible), wheel 154 would advance 4 teeth for each turn of eccentric 104, but this advance would take place during approximately half a turn of eccentric 104, during the rest of said turn wheel 154 being idle. This would give a jerky movement in sprocket 148, which would be undesirable. However, with all of the pawls engaged, as they would be whenever pawl 172 is engaged and as shown in FIG. 7, movement would be initiated for example by pawl 198, continued by pawl 202, further continued by pawl 172, and completed by pawl 206, so that the movement of wheel 174 would be approximately continuous. Such continuous or nearly continuous movement of wheel 154 is, of course, altered or distorted somewhat by the eccentric or gyrating movement of sprocket 178, the movement being slowed while sprocket 178 is in the phase of movement toward sprocket 148 and speeded while sprocket 178 is moving away from sprocket 148. However, this movement is never sufficient to cause any appreciable stoppage or dwell in the movement of sprocket 148, a diagram of the movement of sprocket 148 simulating a wave or ripple movement, which is particularly advantageous in the actuation of apron or conveyor C.

Pawls 198, 206, 172 and 202 may be engaged and disengaged at will by means of a lug 208, and pins 210, 212 and 214 fixed on a plate 216 supported adjacent plate 160 and rotatable about shaft 22 in any suitable manner. Plate 216 may be rocked by means of an arm 218, and in the position shown pins 210, 212 and 214 will engage a rib portion as 219 on each of pawls 206, 172 and 202 and hold them out of contact with teeth 167. Pawl 198 is held out of contact with teeth 167 by means of above mentioned lug 208, fixed on plate 216 and engaging a heel portion 221 of pawl 198. As arm 218 is shifted to rock plate 216 in a clockwise direction, lug 208 will first shift in a downward direction, allowing pawl 198 to swing into contact with wheel 154. This, as above explained, will cause rotation of wheel 154 to the extent of one tooth for each revolution of eccentric portion 105. Further rocking of plate 216 will cause pin 214 to register with a cutaway portion 222 in pawl 202, allowing the latter to swing into contact with wheel 154 as seen in FIG. 8. This, as above explained, will cause a two tooth advance of wheel 154, while further rocking of plate 216 will successively engage the pawls 172 and 206 in similar manner. Arm 218 may be actuated from the front of the spreader, normally by the tractor driver.

Turning to FIG. 1, arm 218 is pivotally connected with a link or pull rod 224, which extends forwardly along the side of box B and connects with an arm 226 fixed in relation to a shaft 228 journaled transversely in box B and having fixed thereon a lever 230. Lever 230 may be rocked in an up-and-down direction in a slot 232 in wall 50 to cause rocking of shaft 228, and through arm 226 and rod 224, corresponding rocking of above mentioned arm 218. Wall 50 provides a plurality of notches 234 and 236 engaged by a detent 238 of any suitable type on lever 230 to fix the lever in position. The parts are so proportioned that, with detent 238 in notch 234, arm 218 and plate 216 will be in the position shown in FIG. 6 so that there will be no resultant motion of conveyor C. Shifting of lever 230 for detent 238 to engage any of notches 236 will provide various positions of plate 216 as described so as to provide a feed of one or more teeth for each revolution of eccentric portion 104 or pulley 72. In this manner the feeding of material may be started, stopped or controlled at any time.

Figure 12:
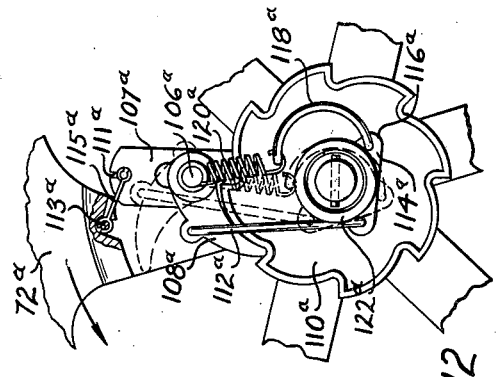
FIG. 12 shows construction common to FIGS. 2 and 10, but including details shown in FIG. 10.
Figure 10:
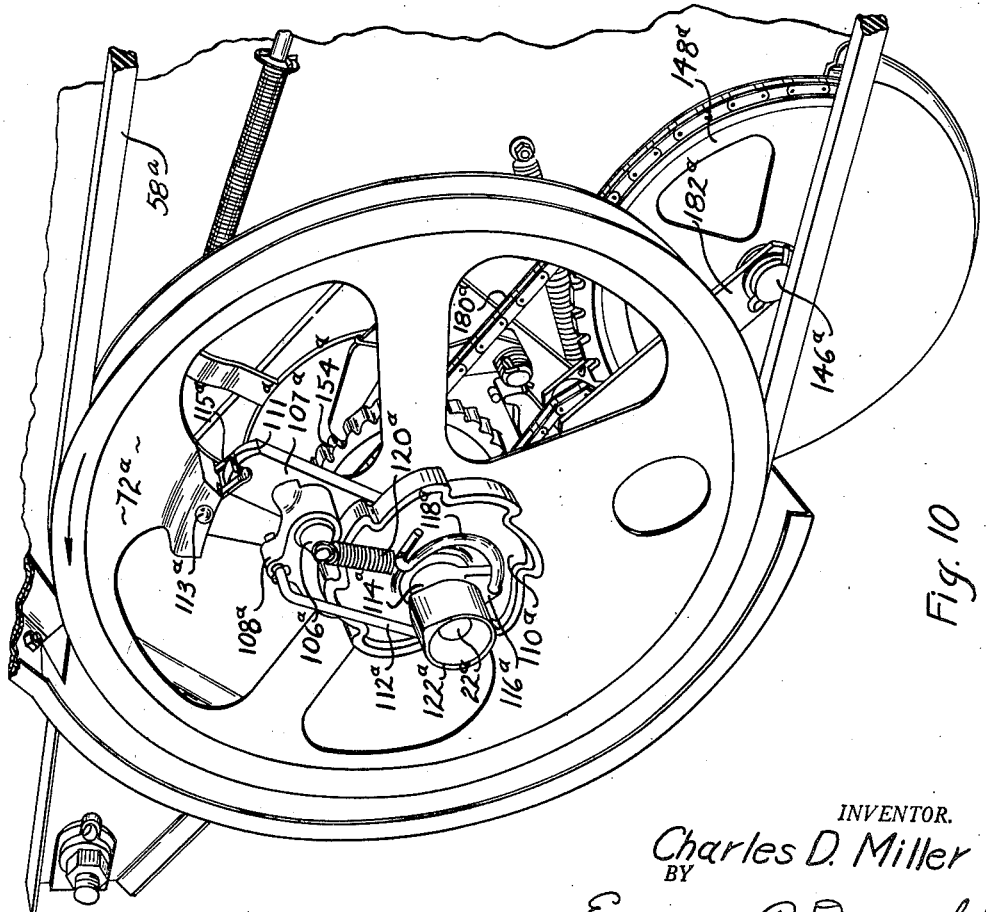
FIG. 10 is a view similar to FIG. 2, further enlarged, and showing modification.

FIGS. 10, 11 and 12 show a modification of the structure heretofore described and which incorporates a frangible element to relieve the parts from destructive stresses in the event that the beaters or the widespread are blocked for any reason while the mechanism is being driven. A belt 58a runs over a large pulley 72a, which is journaled on a hub portion 104a and which has an eccentric portion 105a, the hub being journaled on a shaft 22a and therefore capable of rotating freely in relation thereto. Pulley 72a drives shaft 22a through a safety ratchet type clutch device, including a pin 106a fixed to a driving arm 107a, fixed on above mentioned hub 104a. Pin 106a extends substantially parallel to shaft 22a and is radially spaced therefrom so as to carry a pawl 108a extended from the pin generally in the direction of rotation of pulley 72a and engaged with one of the teeth of a ratchet wheel 110a fixed in relation to shaft 22a. Arm 107a in the present instance extends somewhat beyond pin 106a and is provided with a notch 111a through which it is driven from pulley 72a. Pulley 72a has fixed therein a pin 113a extending in the present instance generally parallel to above mentioned pin 106a. Pawl 108a is urged into engagement with ratchet 110a by a link 112a pivotally connected to a sleeve 114a through which it is controlled in a manner similar to heretofore described pawl 108.

A frangible element 115a is provided in the present instance comprising a link of the type commonly incorporated in chain of the kind known as "ribbon chain." Chain link 115a is journaled at one end on pin 113a and at the other end engaged in slot 111a. Rotation of pulley 72a counterclockwise, as seen in FIGS. 10 and 12, therefore exerts a tension on link 115a and pulls arm 107a in a corresponding direction so that pulley 72a and arm 107a rotate as one. As will be apparent, pawl 108a then drives ratchet wheel 110a in manner substantially identical with that in which pawl 108 drives ratchet wheel 110, as previously described. However, in the event that the beaters are blocked by frozen material, or if shaft 22a is prevented from rotating for any reason, the strength of link 115a will be exceeded and the link will fracture, allowing pulley 72a to rotate along with hub 104a while arm 107a, together with pawl 108a, wheel 110a and shaft 22a remain stationary. Under these conditions hub 104a will remain stationary with arm 107a so that no serious damage beyond the destruction of link 115a will be inflicted.

Sleeve 114a, as in the case of previously described sleeve 114, is journaled on shaft 22a and has a lug or bearing 116a in which is journaled an offset link 118a, which extends generally in the direction of pin 106a about sleeve 114a and connects with a spring 120a which is anchored on pin 106a. Sleeve 114a has a brake portion 122a and is prevented from shifting axially on shaft 22a by pins 124a and 126a, a washer 128a being interposed within brake portion 122a. The operation of this construction is substantially the same as that shown in FIGS. 2 and 9, it being possible to engage pawl 108a by turning brake portion 122a in a counterclockwise direction, and to disengage pawl 108a (when not under load) by turning brake portion 122a clockwise, or if running, retarding it slightly by means of a brake shoe, as 124 in FIG. 1.

Hub 105a has a toothed wheel 154a journaled thereon and having a sleeve portion 176a carrying a sprocket 178a which connects, through a chain 180a, with a sprocket 148a fixed to a feed shaft 146a, all in a manner similar to the mechanism heretofore disclosed. A chain tightener generally designated as 182a, conveniently identical with chain tightener 182, is used with chain 180a in the same manner.

For safety, and to protect the feeding and beater driving mechanism, a cover 240, FIG. 13, is connected by a hinge 242 to a portion of box B and to which is pivoted on a pin 244, above mentioned brake shoe 124, brake portion 122 projecting through a suitable opening in cover 240 into the path of movement of shoe 124. Cover 240 has a shoulder 246 to which is pivoted outwardly of hinge 242 a rod 248, slidable in a suitable opening in a bracket 250 fixed on extension 18 so as to slide up and down therein as cover 240 is raised and lowered. A spring 252 is positioned to press upwardly against bracket 250 and downwardly against an abutment 254 fixed on rod 248 so that the spring pressure tends to hold cover 240 in lowered position. However, when the cover is raised, for example manually, the pivot point of rod 248 will be shifted inwardly of hinge 242, as seen in dotted lines in FIG. 14, whereupon the pressure of spring 252 will tend to maintain the parts in the dotted position, with cover 240 raised for access to the feed mechanism when necessary.

The operation of the spreader is thought to be clear from the foregoing description, and no further explanation should be necessary except to say that the power take-off shaft 44 actuates the beater shaft 22 through the belt 58 traveling about pulleys 54, 64, 72 and 68, pulley 72 driving shaft 22 through pawl 108 and ratchet wheel 110. This drive may be readily interrupted by retarding brake portion 122 at such times as substantially all of the load has been discharged from the spreader. However, the drive cannot again be engaged until the rotation of the parts has been stopped by the usual means on the tractor. Shaft 22 acts as the main driveshaft for beater 14 and widespread 26 while it supports and drives beater 24. The drive to the feed rake or conveyor is accomplished through a gyrating displacement of toothed wheel 154 when the latter is engaged by two or more spaced pawls, a plurality of such pawls being engageable at will in a selected pattern which will give a variety of speeds in conveyor C. The movement of the conveyor is relatively smooth by virtue of the motion produced by the peculiar action of the groups of pawls on the gyrating toothed wheel.

By virtue of the disclosed construction the beaters, widespread and feed conveyor may be started simultaneously and, when the load is discharged, the beaters may be stopped while the conveyor continues to run to clean out the last traces of material from the spreader. However, it is impossible to disengage and stop the beaters while the conveyor continues to operate if there is any appreciable amount of material still being discharged. Conversely, it is not possible to engage the positive drive to the beaters and widespread while the driving mechanism is rotating.

A readily replaceable frangible connection is provided which may break if potentially dangerous loads are encountered in the mechanism, and a convenient cover encloses the same but is readily shifted out of the way when necessary.

What is claimed as new and desired to be secured by Letters Patent of the United States is:

1. In a variable feed drive for use in a manure spreader of the type including a wagon box, a movable conveyor in the box, distributing mechanism at one end of the box and a conveyor actuating shaft journaled in the box and connected for actuating said conveyor by reason of rotation of said actuating shaft; the combination of a beater shaft journaled on said wagon box and having an eccentric portion, means for rotating the eccentric portion, a toothed wheel journaled on said eccentric portion whereby to revolve in a path eccentric to said beater shaft upon rotation of said eccentric portion, a plurality of pawls spaced from said eccentric portion and pivotally supported from said wagon box in position to engage the teeth of said toothed wheel, means yieldingly urging said pawls into engagement with said teeth, motion transmitting mechanism connected to said toothed wheel and to said conveyor actuating shaft to cause rotation of said conveyor actuating shaft as a result of rotation of said toothed wheel, and shiftable means positioned for successively engaging said pawls, overcoming said yielding urging means, and shifting said pawls out of engagement with said toothed wheel for varying the rate of rotation of said toothed wheel, and consequently the rate of motion of said conveyor actuating shaft.

2. In a variable feed drive for use in a manure spreader of the type including a wagon box, a movable conveyor in the box, distributing mechanism at one end of the box and a conveyor actuating shaft journaled in the box and connected for actuating said conveyor by reason of rotation of said actuating shaft; the combination of a driven shaft journaled on said wagon box and having an eccentric portion, means for rotating said eccentric portion, a toothed ratchet wheel journaled on said eccentric portion whereby to revolve in a path eccentric to said driven shaft upon rotation of said eccentric portion, a pawl spaced from said eccentric portion and pivotally supported from said wagon box in position to engage the teeth on said ratchet wheel, means yieldingly urging said pawl into engagement with said teeth, motion transmitting mechanism connected to said ratchet wheel and to said conveyor actuating shaft to cause rotation of said conveyor actuating shaft as a result of rotation of said ratchet wheel, and shiftable means positioned for engaging said pawl, overcoming said yielding urging means, and shifting said pawl out of engagement with said ratchet wheel for controlling the rotation of said ratchet wheel, and consequently the motion of said conveyor actuating shaft.

3. In a variable feed drive for use in a manure spreader of the type including a wagon box, a movable conveyor in said wagon box, and distributing mechanism at one end of said box; the combination of a conveyor actuating shaft, a beater shaft spaced from said conveyor actuating shaft and having an eccentric portion, a toothed wheel journaled on said eccentric portion whereby to revolve in a path eccentric to said beater shaft upon rotation of said eccentric portion, means for rotating said eccentric portion, a plurality of pawls pivotally supported at points spaced from said eccentric portion in position to engage the teeth on said wheel, means yieldingly urging said pawls into engagement with said teeth, motion transmitting mechanism connected to said toothed wheel and to said conveyor actuating shaft to cause rotation of said conveyor actuating shaft by reason of rotation of said toothed wheel, and shiftable means positioned for successively engaging said pawls, overcoming said yielding urging means, and shifting said pawls out of engagement with said toothed wheel for varying the rate of rotation of said toothed wheel, and consequently the rate of motion of said conveyor actuating shaft.

4. In a variable feed drive for use in a manure spreader of the type including a wagon box, a movable conveyor in the box, distributing mechanism at one end of the box and a conveyor actuating shaft journaled in the box and connected for actuating said conveyor by reason of rotation of said actuating shaft; the combination of a driven shaft journaled on said wagon box and having an eccentric portion, a toothed wheel journaled on said eccentric portion whereby to revolve in a path eccentric to said driven shaft upon rotation of said eccentric portion, means for rotating said eccentric portion, a plurality of pawls spaced from said eccentric portion and pivotally supported from said wagon box in position to engage the teeth on said toothed wheel, means yieldingly urging said pawls into engagement with said teeth, motion transmitting mechanism connected to said toothed wheel and to said conveyor actuating shaft to cause rotation of said conveyor actuating shaft as a result of rotation of said toothed wheel, and means positioned for successively engaging said pawls overcoming said yielding urging means and shifting said pawls out of engagement with said toothed wheel for varying the rate of rotation of said toothed wheel, and consequently the rate of motion of said conveyor actuating shaft.

5. In a spreader of the type including a wagon box supported for movement over the ground and having a closed front end and a generally open rear end; the combination of a power input shaft at the front end of said box, disposed substantially in the direction of travel thereof, a first pulley fixed on said shaft adjacent said closed front end, a pair of idler pulleys journaled for rotation on said box at one side of said closed front end, a beater shaft rotatably supported transversely of said box adjacent said open rear end, a second pulley supported on and fixed in relation to said beater shaft at the side of said open end corresponding to that on which said idler pulleys are journaled, a driving belt engaged about said first pulley, said idler pulleys and said second pulley to transmit motion from said power input shaft to said beater shaft, and means connected with said wagon box and with one of said pulleys for shifting said pulley in a direction transverse to its axis of rotation for securing desired tension in said driving belt.

6. In a spreader of the type including a wagon box supported for movement over the ground and having a closed front end and a generally open rear end; the combination of a bearing fixed on the front end of said box, a power input shaft at the front of said box journaled in said bearing and disposed substantially in the direction of travel of the spreader, a first pulley fixed on said shaft adjacent said closed front end, a pair of idler pulleys journaled for rotation on said box at one side of said closed front end, a second shaft rotatably supported transversely of said box adjacent said open rear end, a second pulley supported on and fixed in relation to said second shaft at the side of said open end corresponding to that on which said idler pulleys are journaled, a driving belt engaged about said first pulley, said idler pulleys and said second pulley to transmit motion from said power input shaft to said second shaft, and means connected with said wagon box and with said bearing for shifting said bearing on said front end in a direction transverse to said power input shaft for securing desired tension in said driving belt.

7. In a spreader of the type including a wagon box supported for movement over the ground and having a closed front end and a generally open rear end, the combination of a power input shaft at the front end of said box, disposed substantially in the direction of travel thereof, a first pulley fixed on said shaft adjacent said closed front end, a pair of idler pulleys journaled for rotation on said box at one side of said closed front end, a second shaft rotatably supported transversely of said box adjacent said open rear end, a second pulley supported on and fixed in relation to said second shaft at the side of said open end corresponding to that on which said idler pulleys are journaled, and a driving belt engaged about said first pulley, said idler pulleys and said second pulley to transmit motion from said power input shaft to said second shaft.

8. In a variable feed drive for use in a manure spreader of the type including a wagon box, a movable conveyor in the box, distributing mechanism at one end of the box and a conveyor actuating shaft journaled in the box and connected for actuating said conveyor by reason of rotation of said actuating shaft; the combination of a beater shaft journaled on said wagon box and having an eccentric portion, means for rotating the eccentric portion, a toothed wheel journaled on said eccentric portion whereby to revolve in a path eccentric to said beater shaft upon rotation of said eccentric portion, a plurality of pawl assemblies spaced from said eccentric portion, pivotally supported from said wagon box in position to engage the teeth on said toothed wheel and yieldingly urged into engagement with said teeth, motion transmitting mechanism connected between said toothed wheel and said conveyor actuating shaft to cause rotation of said shaft as a result of rotation of said toothed wheel, and siftable means positioned to engage said pawl assemblies and movable in a direction to successively shift said pawl assemblies out of engagement with said toothed wheel for varying the rate of rotation of said toothed wheel, and consequently the rate of motion of said conveyor actuating shaft.

9. In a variable feed drive for use in a manure spreader of the type including a wagon box, a movable conveyor in the box, distributing mechanism at one end of the box and a conveyor actuating shaft journaled in the box and connected for actuating said conveyor by reason of rotation of said actuating shaft; the combination of a second shaft journaled on said wagon box and having an eccentric portion, means for rotating the eccentric portion, a toothed wheel journaled on said eccentric portion whereby to revolve in a path eccentric to said second shaft upon rotation of said eccentric portion, a plurality of pawl assemblies spaced from said eccentric portion in position to engage the teeth on said toothed wheel, each pawl assembly comprising a pivot element supported from said wagon box, a finger portion pivotally supported by said pivot element, and a resilient element connected to the finger portion so as to urge it into yielding engagement with said teeth, motion transmitting mechanism connected between said toothed wheel and said conveyor actuating shaft to cause rotation of said shaft as a result of rotation of said toothed wheel, and shiftable means positioned to engage said pawl assemblies and movable in a direction to successively shift said pawl assemblies out of engagement with said toothed wheel for varying the rate of rotation of said toothed wheel, and consequently the rate of motion of said conveyor actuating shaft.

10. In a spreader of the type including a body portion having upwardly directed sides, an open rear end, spreading mechanism adjacent said open end and driving mechanism on one of said upwardly directed sides, means for enclosing said mechanism including a hinge supported on said side adjacent said mechanism, a cover supported on and extending from said hinge in position to enclose said mechanism, a pivot carried on said cover spaced from said hinge, and means exerting a resilient pressure on said pivot in a path extending past and at one side of said hinge to urge said cover toward a position enclosing said mechanism, and said pivot being positioned to shift, when said cover is swung away from said mechanism, to a position wherein said resilient pressure is exerted in a path extending past and on the other side of said hinge to maintain said cover in said position away from said mechanism.

References Cited in the file of this patent

UNITED STATES PATENTS

| 1,548,427 | Aldeen | Aug. 4, 1925 |
| 1,868,337 | Storm | July 19, 1932 |
| 2,043,151 | Button | June 2, 1936 |
| 2,212,252 | Srodulski | Aug. 20, 1940 |
| 2,263,748 | Webb | Nov. 25, 1941 |
| 2,692,506 | Hill | Oct. 26, 1954 |
| 2,699,337 | Best | Jan. 11, 1955 |
| 2,798,726 | Bottlander | July 9, 1957 |
| 2,804,308 | Neighbour | Aug. 27, 1957 |